United States Patent [19]

Sanderson

[11] 4,113,996

[45] Sep. 12, 1978

[54] VOLTAGE CONTROLLED CURRENT SOURCES FOR ACTIVE HYBRID CIRCUIT

[75] Inventor: Richard Barton Sanderson, Lisle, Ill.

[73] Assignee: Bell Telephone Laboratories, Incorporated, Murray Hill, N.J.

[21] Appl. No.: 798,787

[22] Filed: May 20, 1977

[51] Int. Cl.² ............................................. H04B 1/58
[52] U.S. Cl. ........................ 179/170 NC; 179/170 D
[58] Field of Search ....... 179/170 R, 170 D, 170 NC, 179/81 R, 81 B, 170 T

[56] References Cited

U.S. PATENT DOCUMENTS

| | | | |
|---|---|---|---|
| 2,629,024 | 2/1953 | Edwards ...................... | 179/170 NC |
| 3,180,947 | 4/1965 | Haselton, Jr. et al. ....... | 179/170 NC |
| 3,529,099 | 9/1970 | Ribner ............................ | 179/81 R |
| 3,700,831 | 10/1972 | Aagaard et al. .............. | 179/170 NC |
| 3,855,430 | 12/1974 | Colardelle et al. ........... | 179/170 NC |
| 3,909,559 | 9/1975 | Taylor .......................... | 179/170 NC |
| 4,053,722 | 10/1977 | Nahay ........................... | 179/170 NC |

Primary Examiner—Kathleen H. Claffy
Assistant Examiner—Randall P. Myers
Attorney, Agent, or Firm—Frederick W. Padden

[57] ABSTRACT

An active hybrid circuit equipped with a resistor bridge, balance network and transmit and receive amplifiers for 2-wire to 4-wire long haul trunk communication between a telephone central office and a distantly located operator console is disclosed. High impedance current sources having voltage follower operational amplifiers are integrated into the hybrid for reducing hybrid bridge loading on the bidirectional 2-wire path while providing adjustable levels of transmission in all directions. One of the high impedance sources is responsive to signals received from the receive amplifier via a bridge resistor for generating output currents to produce desired levels of the received signal on the 2-wire bidirectional path. A second one of the sources is responsive to signals received from the receive amplifier via another bridge resistor for generating currents within the bridge which are opposite to those of the first source and which cancel the receive signal at the input of the transmit amplifier to preclude undesired circulation of that signal back to the operator console.

18 Claims, 2 Drawing Figures

VOLTAGE CONTROLLED CURRENT SOURCES FOR ACTIVE HYBRID CIRCUIT

BACKGROUND OF THE INVENTION

This invention relates to electronic hybrid circuits used for 2-wire to 4-wire communication and particularly to an active hybrid circuit equipped with high impedance current sources and suitable for use in a telephone system for communication between a 2-wire bidirectional central office switching path and a distantly located operator console via a long haul 4-wire trunk.

Telephone companies frequently locate operator consoles at great distances from the central switching machine which they serve. The location is sometimes determined by the practical availability of operators, for example, only in surburban areas displaced from an urban switching office. In such a situation, it is a common practice for the telephone company to utilize a 4-wire long haul trunk arrangement from the remote operator location to the distant switching office and a hybrid circuit for interface communication between the 4-wire trunk and the conventional 2-wire switching network in the office.

A problem in such prior art long haul trunk arrangements is that a large number of circuit components have heretofore been required for furnishing customers with high quality transmission and reducing the impedance loading effect of the hybrid circuit and the 4-wire trunk on the 2-wire central office path. The components usually include a sophisticated negative impedance converter and balancing network. Despite sustained efforts to reduce the cost and size of such arrangements as well as other innovations in circuit design and fabrication techniques, negative impedance facilities are yet needed and prove to be costly and complex adjuncts to the hybrid circuitry. Another disadvantage is that the negative impedance balancing networks occasionally require time consuming and critical empirical adjustments to cancel 4-wire trunk capacitances and other imbalances.

SUMMARY OF THE INVENTION

An object of my invention is to improve hybrid circuit arrangements and specifically to reduce the number of circuit components in long haul hybrid transmission circuits.

A specific object is to eliminate the need for negative impedance converters and balancing networks in long haul hybrid circuit arrangements together with the undesired prior art adjustments of such converters and networks.

A solution to the foregoing problem and disadvantages is achieved in accordance with a specific exemplary embodiment which utilizes an active hybrid equipped with voltage controlled operational current amplifiers specifically designed for the 2-to-4-wire conversion without negative impedance converters and for use in an operator trunk circuit extending between a central office and a remote operator location.

In the illustrative embodiment of my invention, I provide a resistor bridge hybrid arrangement equipped with an adjustable gain transmit amplifier for transmitting from the bidirectional 2-wire path to a 2-wire transmit path of the 4-wire trunk toward an operator console. An adjustable gain receive amplifier is furnished for conveying signals received from the operator console to the bidirectional path.

It is a feature of my invention that a first voltage controlled current source is responsive to the output of the receive amplifier for providing a high impedance source of received signal current to the bidirectional path. The high impedance has minimal loading effect on the bidirectional path due to the bridging of the hybrid circuit and with the gain of the transmit and receive amplifiers, eliminates the need for the negative impedance converter and its balancing network. Advantageously, the current source includes a differential voltage follower operational amplifier having inverting and noninverting inputs and an output. Bias voltage is connected to the inverting amplifier via a resistor. The gain of the follower is controlled by a resistor connected between its output and inverting input. The follower is driven by an amplified receive signal from the output of the receive amplifier via a first bridge resistor. Accordingly, the operational amplifier follows the amplified receive signal voltages and generates at its output and a bidirectional transmission node of the bridge a current for producing a desired level of receive signal on the bidirectional path.

Another feature of my invention is the provision of a second voltage controlled current source which functions within the bridge to cancel signals received from the operator console from being circulated through the bridge back to the operator console. The second current source is responsive to the output of the receive amplifier for injecting into the bridge a receive signal current advantageously opposite to that generated by the first voltage controlled current source. As a consequence, desired receive signal cancellation occurs at the input of the hybrid transmit amplifier while, at the same time, a desired level of received signal is coupled to the bidirectional path. The second current source is equipped with a voltage follower operational amplifier having noninverting and inverting inputs and an output. Bias voltage is connected through a resistor to the noninverting input. Its gain is controlled by a resistor connected between its output and inverting input. The second follower is driven by the amplified receive sgnal from the output of the receive amplifier via a second bridge resistor. As a consequence, the follower generates an output current which circulates through a balance network and third and fourth resistors of the bridge to cancel the effect on the transmit amplifier of the opposite polarity currents generated by the first voltage controlled current source.

It is another feature of my invention that the transmit and receive amplifiers each comprise an adjustable gain differential voltage operational amplifier having noninverting and inverting inputs and an output. Each of the inverting inputs is connected to a bias voltage via a voltage divider comprising resistors and a potentiometer. The gain of each such operational amplifier is controlled by a resistor and an individual one of the potentiometers which are connected between the operational amplifier output and its inverting input.

The noninverting input of the transmit operational amplifier is connected to a transmit node of the bridge via a fifth bridge resistor to the bidirectional node of the bridge and thence via a transformer to the 2-wire bidirectional path. The output of the operational amplifier is resistor-capacitor coupled through a transformer to the transmit pair of the 4-wire trunk extending to the distant operator console.

The receive section of the 4-wire trunk is coupled to the noninverting input of the receive operational amplifier by means of a capacitor, transformer and a resistor. A terminating impedance for the receive section is established by a resistor connected across a secondary winding of the transformer. The output of the receive operational amplifier is connected to a receive node of the bridge wherefrom it is distributed through the first and second bridge resistors for driving both the noninverting and inverting voltage controlled current sources.

To achieve bridge impedance balancing, a network is connected to a bridge balance node at the output of the inverting operational amplifier. The network includes a transformer having a first winding with one terminal connected to the inverting amplifier output and a second terminal connected to a voltage supply. A second winding of the transformer is bridged illustratively by a capacitor, resistor and rheostat.

BRIEF DESCRIPTION OF THE DRAWING

The foregoing features and advantages, as well as others of my invention, will become more apparent from a reading of the following description with reference to the drawing in which.

DETAILED DESCRIPTION

Figure 1:
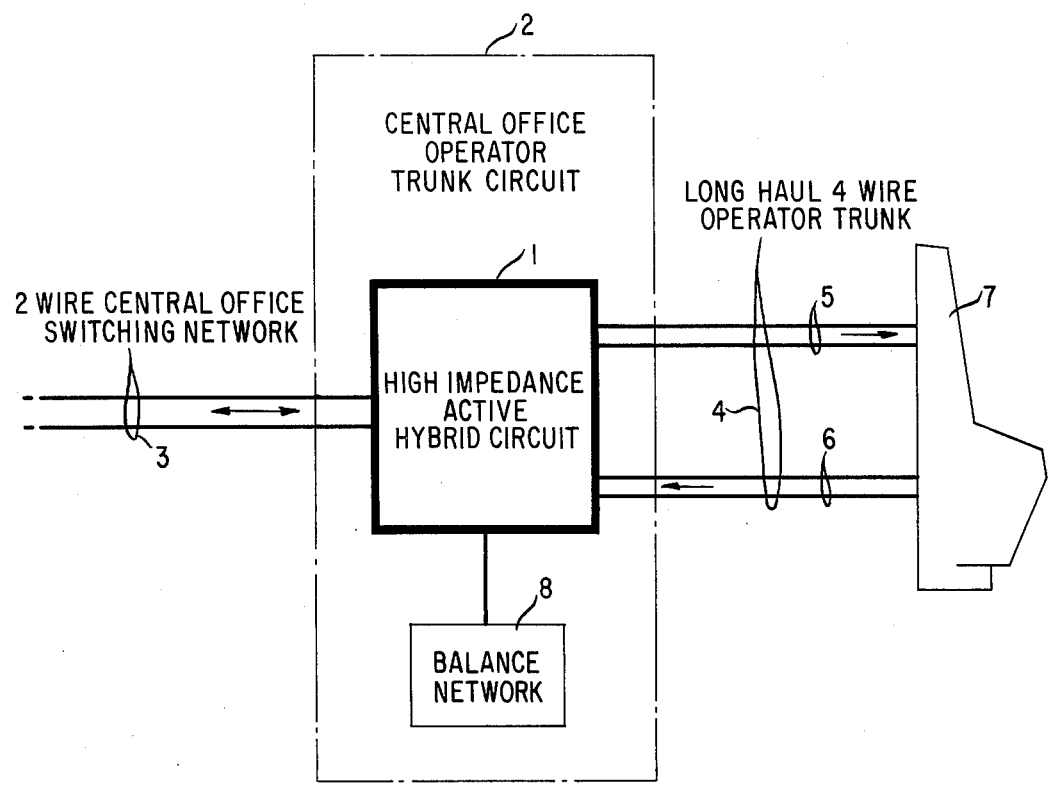
FIG. 1 is an overall block diagram of the hybrid circuit and its balancing network in a central office operator trunk circuit.

In FIG. 1, a high impedance active hybrid circuit 1 is illustratively shown as part of a central office trunk circuit 2. A bidirectional 2-wire path 3 connects hybrid 1 via other conventional trunk circuit apparatus (not shown) to the central office switching network. A 4-wire long haul operator trunk 4 comprising a transmit path 5 and receive path 6 interconnects hybrid 1 and an operator console 7. A balancing network 8 illustratively is terminated in hybrid 1 for circuit impedance balancing. No negative impedance converter or its balancing network is required in the circuitry of FIG. 1. A typical telephone system application of the circuitry of FIG. 1 is to bridge the 4-wire operator trunk 4 to one or more centrex customer trunks, such as path 3, with a minimal amount of impedance loading.

Figure 2:
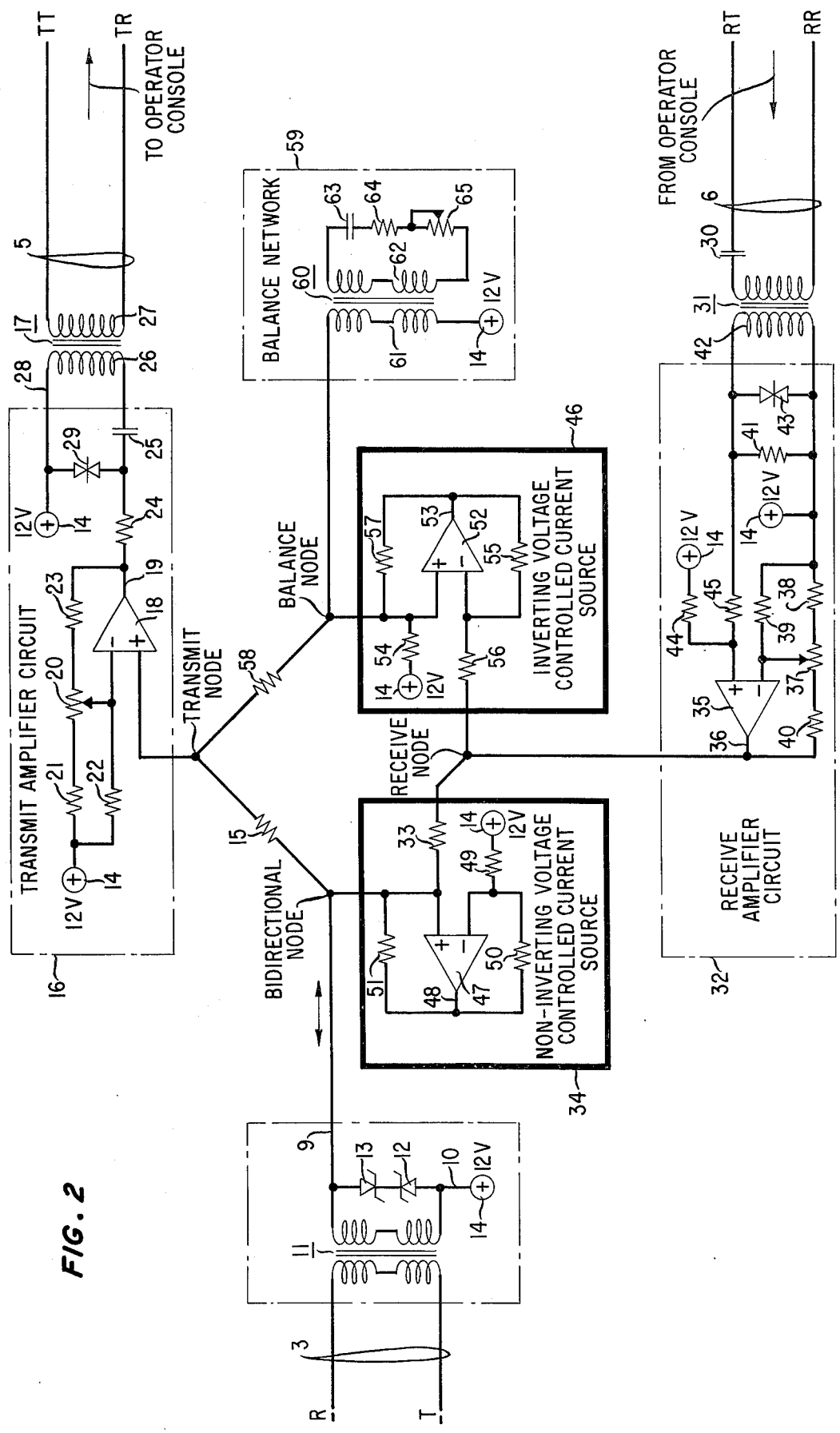
FIG. 2 schematically depicts an exemplary active hybrid circuit according to my invention.

FIG. 2 shows the bidirectional line 3 having tip and ring conductors T and R coupled to conductors 9 and 10 by means of a transformer 11. A pair of zener diodes 12 and 13 are connected cathode-to-cathode and in an overvoltage protection array referenced to a voltage 14 which lies between the differential voltage operational amplifier supply voltages and which is illustratively +12 volts above ground and is connected to conductor 10.

Transmit and receive paths 5 and 6 of the 4-wire trunk are shown at the upper and lower right-hand portion of FIG. 2. Paths 5 and 6 each comprise respective tip and ring conductors TT, TR and RT, RR. Signals from the bidirectional path 3 are transmitted to the transmit path 5 from conductor 9 via a bridge resistor 15, a variable gain transmit amplifier circuit 16 and a transformer 17. Circuit 16 comprises a differential voltage operational amplifier 18 having noninverting and inverting inputs + and − and a single output 19. The inverting input − is connected to a voltage divider network comprising a potentiometer 20 and resistors 21, 22 and 23. Voltage 14 is connected to resistors 21 and 22 and together with potentiometer 20 set the bias operating voltage for amplifier 18. Resistor 23 and potentiometer 20 are connected between output 19 and the inverting input − to establish the adjustable transmit gain of amplifier 18. Transmit signals from line 3 are extended over conductor 9 and resistor 15 to the + input of amplifier 18. The resultant amplified transmit signal at output 19 of amplifier 18 is extended through an impedance matching resistor 24, capacitor 25 and windings 26 and 27 of transformer 17 to the transmit path 5 toward the operator console. One terminus 28 of winding 26 is connected to voltage 14. Diode device 29 is connected between an intersection of resistor 24 and capacitor 25 and voltage 14 to provide protection for amplifier 18 against overvoltage such as may occur as a result of lightning.

Signals received from an operator console on the receive path 6 are extended to the bidirectional path 3 through a capacitor 30, transformer 31, variable gain receive amplifier circuit 32, noninverting voltage controlled current source 34, conductor 9 and transformer 11. Circuit 32 comprises a differential voltage operational amplifier 35 having noninverting and inverting inputs + and − and an output 36. The − input is connected to a voltage divider network including a potentiometer 37 and resistors 38, 39 and 40. Voltage 14 is connected to resistors 38 and 39 and together with potentiometer 37 set the bias operating voltage for amplifier 35. Potentiometer 37 and resistor 40 are connected between the output 36 and the − input to establish the adjustable receive gain of amplifier 35. Resistor 41 is bridged across a winding 42 of transformer 31 for impedance matching with receive path 6. Diode device 43 is similarly bridged across winding 42 for overvoltage protection. The noninverting input + of amplifier 35 is biased to voltage 14 via resistor 44.

Received signals from the operator console are extended from the transformer 31 through a resistor 45 to the + input of amplifier 35. The resultant amplified signal voltage is advantageously utilized for two purposes in accordance with my exemplary embodiment. One is to drive a noninverting voltage controlled current source 34 via a bridge resistor 33 for producing a desired level of the amplified signal on the bidirectional path 3. The second is to drive an inverting voltage controlled current source 46 for substantially cancelling the received signal from being recirculated through the transmit amplifier circuit 16 to the transmit path back to the operator console as a result of the received signal appearing on conductor 9.

Advantageously, the voltage controlled current source 34 provides a high impedance current source toward the bidirectional path 3 and thus minimally loads that path. It comprises an operational amplifier 47 having noninverting and inverting inputs + and − and an output 48. Bias voltage is supplied to the − input from potential 14 via a resistor 49. The transconductance of the voltage controlled current source 34 is controlled by negative feedback from amplifier output 48 through resistor 50 to the − input of amplifier 47 and by positive feedback from amplifier output 48 through resistor 51 to the + input. Operationally, conductor 9 rests at potential 14 and is bridged by the high impedance of the voltage controlled current source 34. Resultingly, the high impedance current source essentially provides isolation of the receive amplifier circuit 32 and the 2-wire path 3 to prevent undesired interactions, or loading effects, while reproducing the amplified received signal from output 36 on path 3 via transformer 11. The transconductance of the voltage to current source 34 combined with the gain of the receive amplifier 32 provide the overall gain between receive path 6 and bidirectional path 3.

To perform the hybrid function, the incoming voltage signal produced on conductor 9 by current from the noninverting current source 34 passing through the impedance of the bidirectional path 3 is substantially cancelled by a matching inverse voltage produced by the current from the inverting voltage controlled current source 46 passing through the impedance of the balancing network 59. Souce 46 advantageously comprises a differential voltage operational amplifier 52 having noninverting and inverting inputs + and − and an output 53. Input + is biased to potential 14 via resistor 54. The transconductance of the inverting voltage controlled current source 46 is controlled by negative feedback from the output 53 of amplifier 52 through resistor 55 to the − input and by positive feedback from the output 53 of amplifier 52 through resistor 57 to the + input. As a consequence, an inverted output current is injected by the inverting voltage controlled current source 46 into the balance node. A voltage signal is produced at the balance node by the injected current signal passing through the balance network 59 which is inverted from the voltage signal produced at the bidirectional node by the noninverted current signal passing through the impedance of the bidirectional path 3. Resistors 15 and 58 combine the two voltage signals such that the net input signal to the + input of amplifier 18 is substantially zero due to the signal on path 6. Accordingly, the only remaining signal then on the transmit path 5 is that produced in response to the signal from the bidirectional path 3.

The ability of the circuitry of FIG. 2 to perform the hybrid function is dependent upon how closely the impedance of bidirectional path 3 is matched by that of the balancing network 59. The latter comprises a transformer 60 having one winding 61 connected between potential 14 and a junction of resistors 57 and 58. Network 59 also comprises a secondary winding 62 having illustratively a capacitor 63, a resistor 64 and a rheostat 65 for providing a matching impedance of a desired magnitude. In practice, it is often desirable to provide a plurality of different capacitors each of which is switchably connectable across the winding 62 for balancing the hybrid bridge impedance.

The hybrid function is also dependent upon the matching of other circuit components. Illustratively, equal values are suitable for the following resistors: 15 and 58 (30.1K), 50 and 55 (1K), 49 and 56 (5.620K), 51 and 57 (0.1K), and 33 and 54 (0.562K). In addition, the operational amplifiers 47 and 52 are suitably "Howland circuits" or current pumps described in "Applications Manual For Computing Amplifiers For Modeling, Measuring, Manipulating And Much Else", George A. Philbrick Researches, Inc., Section III 6, page 65, Copyright 1966. Operational amplifiers of a Texas Instrument Manufacture code UA741 are suitable for use as amplifiers 47 and 52.

While the present invention has been described with respect to a specific illustrative embodiment, it must be understood that the description has only been by way of example. Numerous other embodiments may be devised in light of my teaching without departing from the spirit and scope of my invention.

What is claimed is:

1. An active hybrid circuit for coupling a bidirectional path to an incoming and an outgoing path comprising:
   a transmit and a receive amplifier each having at least one input and an output;
   means for connecting said transmit amplifier output to said outgoing path;
   means for connecting said incoming path to said at least one input of said receive amplifier;
   a bridge network having a bidirectional terminus connectable to said bidirectional path, a transmit terminus connected to said at least one input of said transmit amplifier, a receive terminus connected to said receive amplifier output, a balance terminus and means connecting said balance terminus to said transmit terminus and said bidirectional terminus to said transmit terminus;
   balancing impedance means connected to said balance terminus; and a noninverting voltage controlling high impedance current source means connected between said bidirectional and said receive termini and an inverting voltage controlled high impedance current source means connected between said receive and said balance termini and responsive to a receipt of received voltage signals applied to said receive terminus from said receive amplifier output for producing a prescribed level of said voltage signals on said bidirectional path and concurrently cancelling said voltage signals from said transmit amplifier output.

2. An active hybrid circuit in accordance with claim 1 wherein:
   said noninverting and said inverting voltage controlled current source means each comprises differential voltage operational amplifier circuit.

3. An active hybrid circuit in accordance with claim 2 wherein:
   said bridge network comprises a resistor bridge arrangement; and
   said transmit and receive amplifiers each comprise differential voltage operational amplifiers.

4. An active hybrid circuit in accordance with claim 3 further comprising:
   transformer means connecting said bidirectional path to said bidirectional terminus;
   wherein said means for connecting said transmit amplifier output to said transmit path comprises a transformer arrangement; and
   said means for connecting said at least one input of said receive amplifier to said receive path comprises transformer circuitry.

5. Hybrid circuitry for coupling a bidirectional path to an incoming and an outgoing path of an active hybrid circuit including:
   a transmit and a receive amplifier each having at least one input and an output;
   first means for connecting said output of said transmit amplifier to said outgoing path;
   second means for connecting said incoming path to said at least one input of said receive amplifier;
   an electrical network having a first termination communicating with said bidirectional path, a second termination connected to said output of said receive amplifier, a third termination connected to said at least one input of said transmit amplifier and being responsive to transmit signals applied to said first termination from said bidirectional path for producing said transmit signals on said outgoing path and a fourth termination for network balance;

a high impedance current source means connected to said first termination and responsive to a receipt of voltage signals applied to said second termination from said output of said receive amplifier for supplying current through said first termination to produce a prescribed magnitude of the received signal on said bidirectional path; and means including said fourth termination responsive to said receipt of said voltage signals applied to said second termination for producing an inverted voltage signal at said third termination to cancel from said transmit amplifier output said signals from said receive amplifier output.

6. Hybrid circuitry in accordance with claim 5 wherein said high impedance means includes a noninverting voltage follower current source comprising:

a differential voltage operational amplifier having a first input connected to said first termination, a second input, and an output;

means biasing said second input;

means connecting said operational amplifier output to said second input to control the gain of said operational amplifier; and means serially connecting said operational amplifier output to said first termination.

7. Hybrid circuitry in accordance with claim 6 wherein said first operational amplifier input comprises a noninverting input and said second operational amplifier input comprises an inverting input, said biasing means comprises a source of direct current and a first resistor;

said gain control means comprises a second resistor connected between said inverting input and said operational amplifier output; and said means serially connecting said operational amplifier output to said first termination comprises a third resistor.

8. Hybrid circuitry in accordance with claim 5 further comprising a balance network connected to said fourth termination.

9. Hybrid circuitry in accordance with claim 8 wherein said inverted voltage signal producing means comprises another operational amplifier having first and second inputs and an output;

means serially connecting said first input to said second termination;

apparatus biasing said second input of said other operational amplifier;

a device connecting said output of said other operational amplifier to said first input thereof to control the gain thereof; and circuit means serially connecting said other operational amplifier output to said fourth termination.

10. Hybrid circuitry in accordance with claim 9 wherein:

said other operational amplifier first input comprises an inverting input and said second input thereof comprises a noninverting input;

said biasing apparatus comprises said source of direct current and a fourth resistor;

said gain control device comprises a fifth resistor; and said circuit means comprises a sixth resistor.

11. Hybrid circuitry in accordance with claim 10 wherein said noninverting current source comprises a seventh resistor connected between said first and second terminations;

said electrical network further includes an eighth resistor connected between said first and third terminations and a ninth resistor connected between said third and fourth terminations.

12. Hybrid circuitry in accordance with claim 11 wherein said other operational amplifier comprises a tenth resistor connected between said second termination and said inverting input of said other operational amplifier.

13. Hybrid circuitry in accordance with claim 12 wherein said balance network comprises an impedance network and a transformer having a winding connected between said direct current source and said fourth termination and another winding connected to said impedance network.

14. Hybrid circuitry in accordance with claim 12 wherein each of said bidirectional, outgoing and incoming paths comprises a 2-wire line, and further comprising:

a first transformer having a winding connected to said bidirectional path 2-wire line and another winding having a first terminal connected to said direct current source and a second terminal thereof connected to said first termination;

a second transformer included in said first means for connecting and having a winding connected to said outgoing path 2-wire line and another winding serially connected between said direct current source and said transmit amplifier output; and a third transformer included in said second means for connecting having a winding connectable to said incoming path 2-wire line and another winding serially connected between said direct current source and said at least one input of said receive amplifier.

15. Hybrid circuitry in accordance with claim 14 wherein:

said transmit amplifier comprises a differential voltage operational amplifier having a first input connected to said second termination, a second input and an output;

bias means biasing said last-mentioned second input;

circuit apparatus including said bias means connecting said transmit operational amplifier output to said second input thereof to control the gain of said transmit operational amplifier; and impedance means serially connecting said transmit operational amplifier output to said other winding of said second transformer.

16. Hybrid circuitry in accordance with claim 15 wherein:

said bias means comprises said direct current source, an eleventh resistor and a potentiometer;

said circuit apparatus comprises said potentiometer and a twelfth resistor; and said impedance means comprises a thirteenth resistor and a capacitor.

17. Hybrid circuitry in accordance with claim 14 wherein:

said receive amplifier comprises a differential voltage operational amplifier having a first and a second input and an output connected to said third termination;

bias means biasing said last-mentioned first input;

second bias means biasing said last-mentioned second input;

circuit apparatus connecting said receive operational amplifier output to said second input thereof to control the gain of said receive operational amplifier; and device means serially connecting said first receive operational amplifier input to said other winding of said third transformer.

18. Hybrid circuitry in accordance with claim 17 wherein:
said bias means comprises said direct current source and a fourteenth resistor;
said second bias means comprises said direct current source, a fifteenth resistor and a potentiometer;
said circuit apparatus comprises a sixteenth resistor and said potentiometer; and
said device means includes a seventeenth resistor.

* * * * *

UNITED STATES PATENT AND TRADEMARK OFFICE
CERTIFICATE OF CORRECTION

PATENT NO. : 4,113,996

DATED : September 12, 1978

INVENTOR(S) : Richard B. Sanderson

It is certified that error appears in the above-identified patent and that said Letters Patent are hereby corrected as shown below:

Column 2, line 43, "sgnal" should read --signal--. Column 5, line 14, "Souce" should read --Source--. Column 6, lines 20 and 21, "controlling" should read --controlled--.

Signed and Sealed this

Twenty-ninth Day of May 1979

[SEAL]

Attest:

RUTH C. MASON
Attesting Officer

DONALD W. BANNER
Commissioner of Patents and Trademarks